(12) United States Patent
Propheter-Hinckley

(10) Patent No.: US 10,309,238 B2
(45) Date of Patent: Jun. 4, 2019

(54) TURBINE ENGINE COMPONENT WITH GEOMETRICALLY SEGMENTED COATING SECTION AND COOLING PASSAGE

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 15/354,153

(22) Filed: Nov. 17, 2016

(65) Prior Publication Data

US 2018/0135443 A1    May 17, 2018

(51) Int. Cl.
*F01D 5/28* (2006.01)
*F01D 9/02* (2006.01)
(Continued)

(52) U.S. Cl.
CPC ............... *F01D 9/02* (2013.01); *F01D 5/288* (2013.01); *F01D 11/08* (2013.01); *F01D 11/125* (2013.01); *F01D 25/12* (2013.01); *F02C 3/04* (2013.01); *F04D 29/083* (2013.01); *F04D 29/542* (2013.01); *F04D 29/582* (2013.01); *F23R 3/002* (2013.01); *F05D 2220/32* (2013.01); *F05D 2230/10* (2013.01); *F05D 2230/30* (2013.01); *F05D 2250/28* (2013.01); *F05D 2250/60* (2013.01); *F05D 2260/202* (2013.01); *F05D 2300/20* (2013.01); *F23M 2900/05004* (2013.01); *F23R 2900/03042* (2013.01);
(Continued)

(58) Field of Classification Search
CPC ............... F01D 5/288; F01D 5/14; F01D 9/02
See application file for complete search history.

(56) References Cited

U.S. PATENT DOCUMENTS 3,215,511 A    11/1965   Chisholm
4,137,008 A    1/1979    Grant et al.
(Continued)

FOREIGN PATENT DOCUMENTS

EP    0764764    3/1997
EP    1496140    1/2005
(Continued)

OTHER PUBLICATIONS

U.S. Appl. No. 13/429,474, filed Mar. 26, 2012.
(Continued)

*Primary Examiner* — Richard A Edgar
*Assistant Examiner* — Michael L Sehn
(74) *Attorney, Agent, or Firm* — Carlson, Gaskey & Olds, P.C.

(57) ABSTRACT

A gas turbine engine component includes a passage and a geometrically segmented coating section adjacent the passage. The geometrically segmented coating section includes a wall that has a first side bordering the passage and a second side opposite the first side. The second side includes an array of cells, and there is a coating disposed over the array of cells. The coating defines an exterior side. A cooling passage extends through the wall and the coating. The cooling passage fluidly connects the passage and the exterior side.

24 Claims, 2 Drawing Sheets

(51) Int. Cl.
    *F02C 3/04*           (2006.01)
    *F01D 11/08*         (2006.01)
    *F01D 25/12*         (2006.01)
    *F04D 29/08*         (2006.01)
    *F04D 29/54*         (2006.01)
    *F04D 29/58*         (2006.01)
    *F01D 11/12*         (2006.01)
    *F23R 3/00*           (2006.01)

(52) U.S. Cl.
    CPC ............ *Y02T 50/672* (2013.01); *Y02T 50/676* (2013.01); *Y02T 50/6765* (2018.05)

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,867,639 A * | 9/1989 | Strangman | F01D 11/12 415/173.4 |
| 4,914,794 A | 4/1990 | Strangman | |
| 5,030,060 A * | 7/1991 | Liang | F01D 5/186 415/115 |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,771,577 A * | 6/1998 | Gupta | F01D 5/186 29/889.72 |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,243,948 B1 * | 6/2001 | Lee | B23P 6/002 29/402.05 |
| 6,316,078 B1 | 11/2001 | Smialek | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,686,570 B2 * | 3/2010 | Allen | C23C 26/00 415/173.4 |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,257,041 B1 * | 9/2012 | Liang | F01D 5/186 416/97 R |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 8,852,720 B2 * | 10/2014 | Bolcavage | F01D 5/288 416/97 R |
| 2008/0159850 A1 | 7/2008 | Tholen et al. | |
| 2010/0074726 A1 | 3/2010 | Merrill et al. | |
| 2010/0136258 A1 | 6/2010 | Strock et al. | |
| 2013/0209229 A1 | 8/2013 | Xu et al. | |
| 2016/0090851 A1 | 3/2016 | Carr et al. | |

FOREIGN PATENT DOCUMENTS

| | | |
|---|---|---|
| EP | 1764481 | 3/2007 |
| EP | 2105579 | 9/2009 |
| EP | 2131108 | 12/2009 |
| EP | 2641993 | 9/2013 |
| EP | 2815823 | 12/2014 |
| EP | 2853688 | 4/2015 |
| GB | 2272453 | 5/1994 |
| JP | 61066802 | 4/1986 |
| JP | 05321602 | 12/2003 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202298.0 completed Mar. 7, 2018.

\* cited by examiner

TURBINE ENGINE COMPONENT WITH GEOMETRICALLY SEGMENTED COATING SECTION AND COOLING PASSAGE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A gas turbine engine component according to an example of the present disclosure includes a passage, and a geometrically segmented coating section adjacent the passage. The geometrically segmented coating section includes a wall that has a first side bordering the passage and a second side opposite the first side. The second side includes an array of cells, and a coating disposed in the array of cells. The coating defines an exterior side. A cooling passage extends through the wall and the coating. The cooling passage fluidly connects the passage and the exterior side.

In a further embodiment of any of the foregoing embodiments, the cooling passage is sloped relative to the coating.

In a further embodiment of any of the foregoing embodiments, the cooling passage includes at least one flow guide.

In a further embodiment of any of the foregoing embodiments, the flow guide tapers.

In a further embodiment of any of the foregoing embodiments, the wall defines a portion of the cooling passage and the coating defines another portion of the cooling passage.

In a further embodiment of any of the foregoing embodiments, the cooling passage has an aspect ratio of greater than one.

In a further embodiment of any of the foregoing embodiments, the cooling pas sage tapers.

In a further embodiment of any of the foregoing embodiments, the coating is ceramic.

In a further embodiment of any of the foregoing embodiments, the cells are polygonal.

In a further embodiment of any of the foregoing embodiments, the cooling passage is sloped relative to the coating. The cooling passage includes at least one flow guide, and the wall defines a portion of the cooling passage and the coating defines another portion of the passage.

A gas turbine engine according to an example of the present disclosure includes a compressor section, a combustor in fluid communication with the compressor section, and a turbine section in fluid communication with the combustor. One of the turbine section or the compressor section includes a gas turbine engine component that has a passage, and a geometrically segmented coating section adjacent the passage. The geometrically segmented coating section includes a wall that has a first side bordering the passage and a second side opposite the first side. The second side includes an array of cells. A coating is disposed in the array of cells. The coating defines an exterior side. A cooling passage extends through the wall and the coating. The cooling passage fluidly connects the passage and the exterior side.

In a further embodiment of any of the foregoing embodiments, the cooling passage is sloped relative to the coating.

In a further embodiment of any of the foregoing embodiments, the cooling passage includes at least one flow guide.

In a further embodiment of any of the foregoing embodiments, the wall defines a portion of the cooling passage and the coating defines another portion of the passage.

A method for fabricating a geometrically segmented coating section according to an example of the present disclosure includes depositing a coating on a wall. The wall includes a first side and a second side opposite the first side. The second side includes an array of cells. A cooling passage extends from the first side and through the array of cells to an encapsulation. The coating is deposited in the array of cells. A portion of the coating along the array of cells is removed, and the encapsulation is removed to open the cooling passage.

In a further embodiment of any of the foregoing embodiments, the removing of the encapsulation is conducted after the removing of the portion of the coating.

In a further embodiment of any of the foregoing embodiments, the removing of the portion of the coating includes exposing the array of cells.

A further embodiment of any of the foregoing embodiments includes depositing additional coating with a thickness that does not bridge over the open cooling passage.

In a further embodiment of any of the foregoing embodiments, the coating is formed of ceramic material.

In a further embodiment of any of the foregoing embodiments, the encapsulation projects beyond the array of cells.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
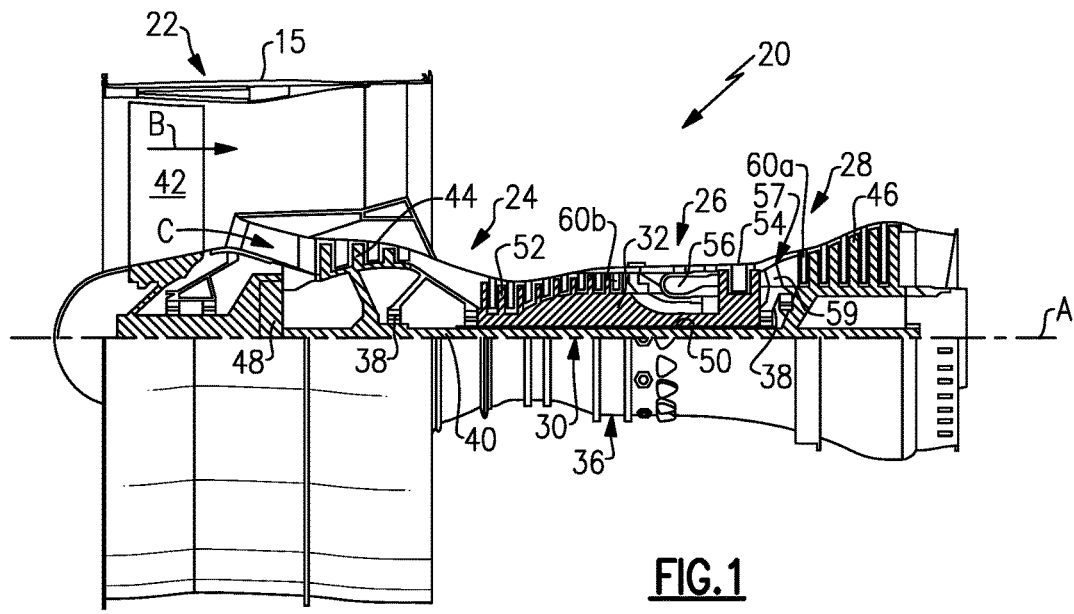
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2A:
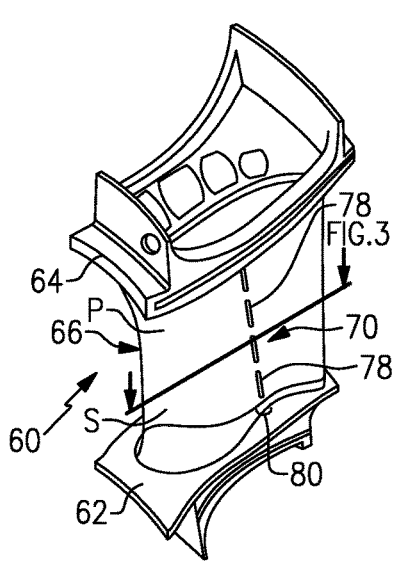
FIG. 2A illustrates an example gas turbine engine component, which in this example is a vane.
Figure 2B:
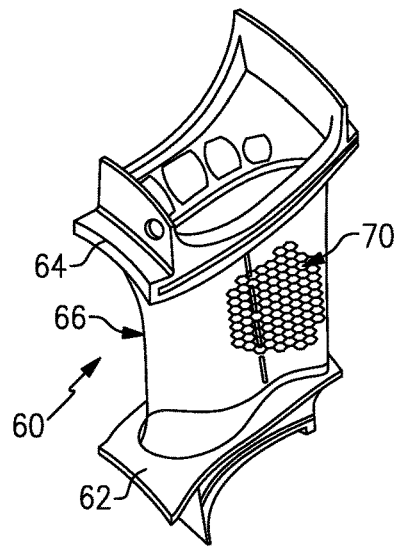
FIG. 2B illustrates the vane of FIG. 2A with a portion of the exterior cutaway.

FIGS. 2A and 2B illustrate one such component. In this example, the component is an airfoil 60, namely a vane. For instance, the vane can be a turbine vane, as represented at 60a in FIG. 1, or a compressor vane as represented at 60b in FIG. 1. As will be appreciated, although the examples herein are described in the context of a vane, this disclosure is not limited to vanes or airfoils, and the examples may also be applicable to blade outer air seals or other components that are exposed to high temperatures in the core flow path.

Figure 3:
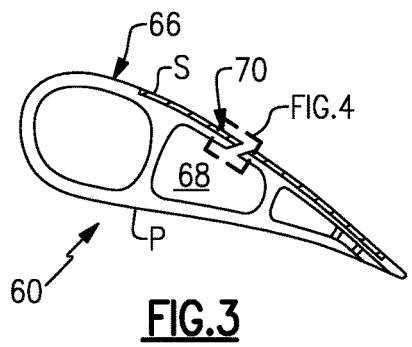
FIG. 3 illustrates a sectioned view of the vane of FIG. 2A.

The airfoil 60 includes a body which generally includes inner and outer platforms 62/64 and an airfoil section 66 that extends radially between the inner and outer platforms 62/64. The airfoil section 66 may be hollow and can include one or more internal passages 68 (FIG. 3). A passage can include a cavity, a channel, or the like.

To enhance the temperature resistance capability of the airfoil 60, the airfoil 60 includes a geometric segmented coating section 70, a portion of which is shown in cutaway in FIG. 2B. The coating section 70 may be integral with the airfoil section 66, but could alternatively be a segment or panel that forms a portion of the airfoil section 66. In this example, the coating section 70 is located on a suction side (S) of the airfoil section 66. Alternatively or additionally, a coating section 70 could also be provided on the pressure side (P) of the airfoil section 66. As will be described in further detail below, the coating section 70 includes a segmented structure and a cooling scheme to enhance temperature resistance capability of the airfoil 60.

Figure 4:
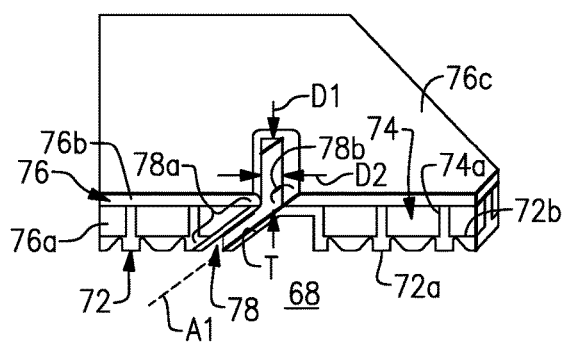
FIG. 4 illustrates a sectioned view of a geometrically segmented coating section of the vane of FIG. 3.

FIG. 3 illustrates a sectioned view through the airfoil section 66, and FIG. 4 illustrates a sectioned view of the coating section 70. The coating section 70 includes a wall 72. The wall 72 includes a first side 72a that will most typically border the passage 68 and a second side 72b that is opposite the first side 72a. The second side 72b includes an array of cells 74 defined by cell sidewalls 74a. The array is a repeating geometric pattern of one or more cell geometries. In this example, the cell sidewalls 74a have a uniform thickness. The cells 74 are hexagonal (see FIG. 6A) but alternatively could be circular, ovular, other polygonal geometry, or mixed cell geometries.

A coating 76 is disposed over the array of cells 74. The cells 74 mechanically facilitate bonding of the coating 76 on the wall 72. The coating 76 is a barrier coating, such as a thermal barrier or environmental barrier, which is formed of a ceramic material. A ceramic material is a compound of metallic or metalloid elements bonded with nonmetallic elements or metalloid elements primarily in ionic or covalent bonds. Example ceramic materials may include, but are not limited to, oxides, carbides, nitrides, borides, silicides, and combinations thereof. The coating 76 may be a monolayer coating but more typically will be a multi-layer coating. For instance, the coating 76 has a first coating layer 76a and a second coating layer 76b. In this example, the second coating layer 76b is a topcoat.

The ceramic material of the coating 76 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 76 may also include a bond coat for attaching the ceramic material to the wall 72 and cells 74. The wall 72 and cells 74 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 74a also facilitate reducing internal stresses in the coating 76 that may occur from sintering at relatively high surface temperatures during use in the engine 20. The sintering may result in partial melting, densification, and diffusional shrinkage of the coating 76 and thereby induce internal stresses. The cell sidewalls 74a serve to produce faults in at least the portion of the coating 76 above the cell sidewalls 74a. The faults provide locations for releasing energy associated with the internal stresses (e.g., reducing shear and radial stresses). That is, the energy associated with the internal stresses may be dissipated in the faults such that there is less energy available for causing delamination cracking between the coating 76 and the underlying wall 72.

As an example, the wall 72 may be fabricated by investment casting, additive manufacturing, brazing, or combinations thereof, but is not limited to such techniques. For instance, the cells 74 can be separately fabricated and brazed to the remaining portion of the wall 72, which can be investment cast or additively fabricated. Alternatively, the cells 74 can be formed by other techniques, such as depositing an alloy coating and removing sections of the alloy coating by machining, electro-discharge machining (EDM), or other removal process.

To produce the coating 76, ceramic coating material is deposited over the cells 74. The deposition process can include, but is not limited to, plasma spray or physical vapor deposition. In one example, plasma spray is used to produce a more durable version of the coating 76. For instance, the coating 76 has a laminar microstructure with grains of ceramic material that have a high aspect ratio. The laminar microstructure is a product of the plasma spray process, in which droplets of melted or partially melted ceramic material are sprayed onto the cells 74. Upon impact, the droplets flatten and solidify, yielding the laminar microstructure. There may be voids or pores among the grains; however, the coating 76 is substantially fully dense.

The coating 76 defines an exterior side 76c, which in this example is the exterior side of the suction side of the airfoil section 66. One or more cooling passages 78 extend through the wall 72 and the coating 76. The cooling passage 78 fluidly connects the passage 68 and the exterior side 76c. For instance, in the illustrated example, the wall 72 defines a portion 78a of the cooling passage 78 and the coating 76 defines another portion 78b of the cooling passage 78. With respect to surface area, the portion 78a provides a majority of the cooling passage 78 in comparison to the portion 78b. In one example, the portion 78a provides approximately 50% to approximately 90% of the surface area of the cooling passage 78. In further examples, the portion 78a is 60%, 70%, or 80% of the surface area.

As shown in FIG. 2A, the airfoil section 66 has a row 80 of the cooling passages 78 that are generally aligned in a radial direction. Each such cooling passage 78 may slope relative to the coating 76. For instance, each such cooling passage 78 slopes along a central axis A1 (FIG. 4) that forms a non-perpendicular angle at the intersection of the axis A1 and the coating 76. Most typically, each cooling passage 78 will be sloped toward a trailing end of the airfoil section 66. The slope allows a film of cooling bleed air to be discharged along the exterior side 76c of the coating 76. The cooling bleed air also removes heat from the wall 72 and cell sidewalls 74a as it moves through the cooling passage 78.

In the illustrated examples, the cooling passage 78 generally has a rectangular, slot-like profile, which may be desired for providing film cooling. For instance, the rectangular profile has a first dimension D1, a second dimension D2, and an aspect ratio of D1/D2 that is greater than one. Alternatively, the cooling passage 78 may have a different, elongated profile geometry that has an aspect ratio of greater than one. The cooling passage 78 may also taper. For instance, the cooling passage 78 tapers (represented at "T") from the first side 72a toward the second side 72b but alternatively could be tapered from the second side 72b toward the first side 72a. The taper serves to accelerate or decelerate air flow. The taper may also serve as a self-healing type feature to provide more air flow as the coating section 70 erodes away and progressively opens larger cross-sections of the cooling passage 78. Similarly, an inverse taper may provide less air flow by progressively opening smaller cross-sections of the cooling channel 78. In further examples, the taper is not so great as to accelerate the cooling bleed air to a rate that it will be ejected and lost into the core gas path with flowing along the exterior surface 76c for film cooling.

Figure 5:
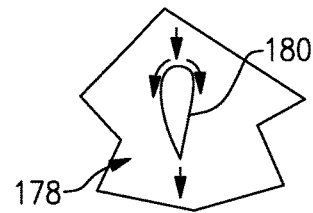
FIG. 5 illustrates a flow guide within a cooling passage.

In a further example, the cooling passage 78 may include a flow guide to control cooling bleed air flow through the cooling passage 78. FIG. 5 illustrates a portion of an example cooling passage 178 with a flow guide 180. In this example, the flow guide 180 is tapered. Although not shown, the larger end of the flow guide is oriented toward the passage 68 and the narrower end is oriented toward the exterior side 76c. The tapered flow guide 180 orients or straightens cooling bleed air flow through the cooling passage 78. The tapered flow guide 180 may alternatively have other geometries, such as but not limited to circular, ovular, or polygonal. It is also to be understood that the cooling passages 78 may include flow guides of mixed geometries, wherein one or more cooling passages 78 includes one or more different flow guide geometries.

Figure 6A:
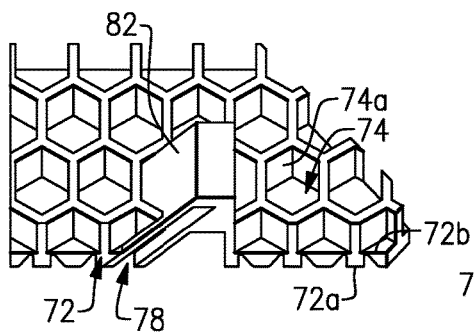
FIGS. 6A, 6B, 6C, and 6D illustrate progressions of an example method of fabricating a geometrically segmented coating section.

FIGS. 6A, 6B, 6C, and 6D depict progressions through an example method of fabricating the component 60. As shown in FIG. 6A, the wall 72 initially has the array of cells 74 without the coating 76 yet deposited thereon. Additionally, there is an encapsulation 82 over the cooling passage 78 that closes the cooling passage 78 and thus prevents any coating material from entering into the cooling passage 78 during the fabrication process. In this example, the encapsulation 82 projects beyond the array of cells 74. For instance, the encapsulation 82 projects above the top surfaces of the cell sidewalls 74a. Alternatively, the encapsulation 82 could be flush with the top surfaces of the cell sidewalls 74a or recessed below the top surfaces of the cell sidewalls 74a. The encapsulation 82 may be fabricated with, and thus integral with, the wall 72. In this regard, the wall 72 and encapsulation form a monolithic body.

Figure 6B:
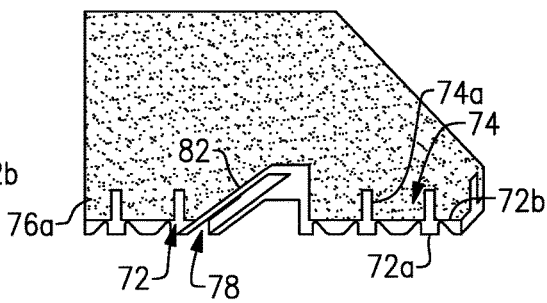

As shown in FIG. 6B, the first coating layer 76a is deposited on the wall 72 over the cells 74 and on the encapsulation 82. In this example, the first coating layer 76a completely covers the cells 74 and the encapsulation 82. In alternative examples, a portion of the encapsulation 82 may be only thinly covered or may not include any, or any substantial amount, of the coating material.

Figure 6C:
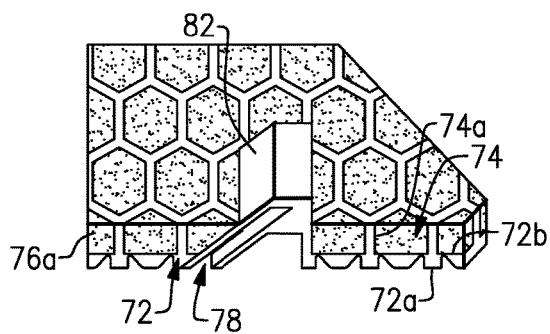

As illustrated in FIG. 6C, a portion of the first coating layer 76a is then removed along the array of cells 74, such as by machining, grinding, and/or abrading. In this example, the portion of the first coating layer 76a is selectively removed down to, or close to, the tops of the cell sidewalls 74a and the encapsulation 82 remains. The tops of the cell sidewalls 74a may be exposed in the process, which may be desirable for producing the faults discussed above. Where an abrasive is used for removal of the portion of the first coating layer 76a, it may be necessary to shield or mask the encapsulation 82 to avoid excessive alloy removal and damage of the wall 72.

Figure 6D:
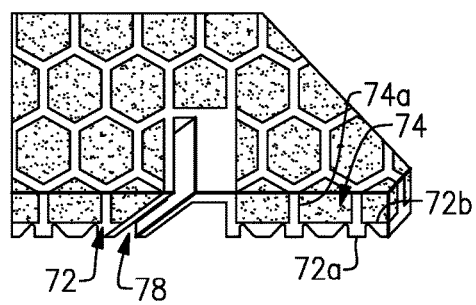

As shown in FIG. 6D, after the removal of the portion of the first coating layer 76a, the encapsulation 82 is then removed, to open the cooling passage 78. For instance, the encapsulation 82 is removed by machining, grinding, electro-discharge machining (EDM), and/or abrasion such that the sides of the cooling passage 78 are flush or substantially flush with the tops of the cell sidewalls 74a. If the initial encapsulation 82 were instead flush with the tops of the cell sidewalls 74a or recessed, the encapsulation 82 is removed using similar techniques, but the sides of the cooling passage 78 are already flush or substantially flush with the tops of the cell sidewalls 74a. Subsequently, the second coating layer 76b is deposited over the array of cells 74 and around the open cooling passage 78 (as shown in final form in FIG. 4). The second coating layer 76b is relatively thin in thickness and there is therefore not a sufficient amount of coating material to bridge over the open cooling passage 78. Some of the coating material may deposit down into the cooling passage 78, but this would not be expected to plug the cooling passage 78 or substantially interfere with flow through the cooling passage 78. If desired, any such coating material that is deposited in the cooling passage 78 could be removed.

The geometrically segmented coating section 70 has a relatively complex geometry, as well as the coating 76. Such a geometry in combination with the coating 76 presents challenges to integrating a cooling scheme, and doing so in a way that is manufacturable. The encapsulation 82 and process described herein provide a practical technique for forming the cooling passage 78 in the coating section 70 and also enable secondary features such as the flow guides 180 to be readily implemented.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:
 a passage; and
 a geometrically segmented coating section adjacent the passage, the geometrically segmented coating section including
  a wall having a first side bordering the passage and a second side opposite the first side, the second side including an array of closed-sided cells defined by cell sidewalls,
  a coating disposed in the array of closed-sided cells, the coating defining an exterior side, and
  a cooling passage that extends through the wall and the coating, the cooling passage fluidly connecting the passage and the exterior side.

2. The gas turbine engine component as recited in claim 1, wherein the cooling passage is sloped relative to the coating.

3. The gas turbine engine component as recited in claim 1, wherein the cooling passage includes at least one flow guide.

4. The gas turbine engine component as recited in claim 3, wherein the flow guide tapers.

5. The gas turbine engine component as recited in claim 1, wherein the wall defines a portion of the cooling passage and the coating defines another portion of the cooling passage.

6. The gas turbine engine component as recited in claim 1, wherein the cooling passage has an aspect ratio of greater than one.

7. The gas turbine engine component as recited in claim 1, wherein the cooling passage tapers.

8. The gas turbine engine component as recited in claim 1, wherein the coating is ceramic.

9. The gas turbine engine component as recited in claim 1, wherein the cooling passage is sloped relative to the coating, the cooling passage includes at least one flow guide, and the wall defines a portion of the cooling passage and the coating defines another portion of the passage.

10. The gas turbine engine component as recited in claim 1, wherein the passage is in a blade or vane.

11. The gas turbine engine component as recited in claim 10, wherein the cell sidewalls have a uniform thickness.

12. The gas turbine engine component as recited in claim 10, wherein the wall defines a portion of the cooling passage and the coating defines another portion of the cooling passage.

13. The gas turbine engine component as recited in claim 12, wherein the wall defines 60% to 90% of the surface area of the cooling passage.

14. The gas turbine engine as recited in claim 1, wherein the closed-sided cells are polygonal cells.

15. A gas turbine engine comprising:
a compressor section;
a combustor in fluid communication with the compressor section; and
a turbine section in fluid communication with the combustor,
at least one of the turbine section or the compressor section including a gas turbine engine component having
a passage, and
a geometrically segmented coating section adjacent the passage, the geometrically segmented coating section including
a wall having a first side bordering the passage and a second side opposite the first side, the second side including an array of polygonal cells defined by cell sidewalls,
a coating disposed in the array of polygonal cells, the coating defining an exterior side, and
a cooling passage that extends through the wall and the coating, the cooling passage fluidly connecting the passage and the exterior side.

16. The gas turbine engine as recited in claim 15, wherein the cooling passage is sloped relative to the coating.

17. The gas turbine engine as recited in claim 15, wherein the cooling passage includes at least one flow guide.

18. The gas turbine engine as recited in claim 15, wherein the wall defines a portion of the cooling passage and the coating defines another portion of the passage.

19. A method for fabricating a geometrically segmented coating section, the method comprising:
depositing a coating on a wall, wherein the wall includes a first side and a second side opposite the first side, the second side includes an array of closed-sided cells defined by cell sidewalls, and a cooling passage that extends from the first side and through the array of cells to an encapsulation, and the coating is deposited in the array of cells;
removing a portion of the coating along the array of cells; and
removing the encapsulation to open the cooling passage.

20. The method as recited in claim 19, wherein the removing of the encapsulation is conducted after the removing of the portion of the coating.

21. The method as recited in claim 19, wherein the removing of the portion of the coating includes exposing the array of cells.

22. The method as recited in claim 19, further comprising depositing additional coating with a thickness that does not bridge over the open cooling passage.

23. The method as recited in claim 19, wherein the coating is formed of ceramic material.

24. The method as recited in claim 19, wherein the encapsulation projects beyond the array of closed-sided cells.

* * * * *